(12) United States Patent
Venture et al.

(10) Patent No.: US 10,102,406 B2
(45) Date of Patent: Oct. 16, 2018

(54) RADIOFREQUENCY IDENTIFICATION DATA SYSTEM OPERATING WITHIN A TOOL CABINET

(71) Applicant: NEOPOST TECHNOLOGIES, Bagneux (FR)

(72) Inventors: Guy Venture, Senas (FR); Jean-Baptiste Pantaloni, Cavaillon (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 0 days.

(21) Appl. No.: 15/418,548

(22) Filed: Jan. 27, 2017

(65) Prior Publication Data
US 2017/0220828 A1    Aug. 3, 2017

(30) Foreign Application Priority Data

Jan. 29, 2016 (EP) .................................. 16305096

(51) Int. Cl.
*G06K 7/10* (2006.01)
*G06K 19/077* (2006.01)

(52) U.S. Cl.
CPC ..... *G06K 7/10346* (2013.01); *G06K 7/10178* (2013.01); *G06K 19/07758* (2013.01); *G06K 19/07773* (2013.01)

(58) Field of Classification Search
CPC ..................... G06K 7/10346; G06K 19/07758
USPC ........................................................ 340/10.1
See application file for complete search history.

(56) References Cited

U.S. PATENT DOCUMENTS

| 8,108,068 | B1* | 1/2012 | Boucher | A61J 7/0084 700/236 |
| 8,770,479 | B1* | 7/2014 | Shoenfeld | G06Q 90/00 235/375 |
| 2012/0211397 | A1* | 8/2012 | Kilian | G06K 7/0008 206/719 |
| 2014/0167574 | A1* | 6/2014 | Shoenfeld | A47B 81/00 312/215 |

FOREIGN PATENT DOCUMENTS

CN    103942888 A    7/2014

OTHER PUBLICATIONS

Extended European Search Report for International Patent Application No. 16305096.6, dated Jul. 26, 2016; 5 pgs.

* cited by examiner

*Primary Examiner* — Vernal Brown
(74) *Attorney, Agent, or Firm* — Cozen O'Connor

(57) ABSTRACT

A UHF radiofrequency identification (RFID) system comprising a UHF RFID reader and at least one UHF RFID antenna for enabling communication of the UHF RFID reader with UHF RFID tags affixed on articles within a cabinet having electrically conductive walls and at least one door, the UHF RFID antennas being positioned within the cabinet and the UHF RFID system further comprises at least one conductive surface (e.g., a brewer, brasseur, or cross-connector) enclosed in a compartment positioned within the cabinet and comprising a conductive surface set in movement by a motor.

14 Claims, 3 Drawing Sheets

RADIOFREQUENCY IDENTIFICATION DATA SYSTEM OPERATING WITHIN A TOOL CABINET

FIELD OF THE INVENTION

The present application relates to the identification and tracking of items and more particularly to radiofrequency identification data (RFID) systems designed to operate within a tool cabinet.

BACKGROUND

Today's business practices often require that tools be traced in production and maintenance environments. Generally, an identification data (ID) device attached to each tool is required. For productivity purposes, such an ID device needs to be read remotely and automatically by electronic readers. Automation reduces errors in information capture and allows for more accurate and more regular inventory management. This requires ID devices, which can communicate.

Radio frequency identification (RFID) is a preferred solution as radio frequency communication allows a diffuse transmission and is tolerant to radio frequency ID devices being hidden, as opposed to optical solutions, which are more directional and quite intolerant to blocking bodies lying in the transmission path. The use of RFID transponders (commonly referred to as RFID tags) is an efficient and economical method for systems for tracking and tracing items within an organization. Producers can check the location of items, in real time, by remotely accessing the data being transmitted by RFID tags attached to those items. Therefore, RFID tags are widely used for the identification and the tracking of items, particularly for items in a shop or a warehouse environment.

Such RFID systems can also be used for tracking and tracing tools in tool cabinets and can provide the following functions: detect the input or output of tools in or from the tool cabinet, inventory of tools stored in each particular tool cabinet and globally in all the tool cabinets, avoid foreign object damage, establish links between the tools and the personnel using them and allow tools monitoring (maintenance, check, periodic control). A RFID system should in particular allow verifying the content of the tool cabinets used within the organization.

Tool cabinets and tools are typically used for example when maintenance personnel go on missions to troubleshoot systems. Tool tracking and tracing is beneficial not only for inventory purpose of the tools, but also for ensuring that tools required for a particular maintenance intervention are effectively in the tool cabinet and have not been left in the field, for example preventing left behind tool from causing foreign object damage, (for example a tool left in a turbine).

In principle, either LF/HF RFID or UHF RFID technologies could be used. However, UHF RFID technology is a preferred solution because of the following issues inherent to LF/HF RFID technology. LF/HF inductive loop antennas are heavier and more expensive than UHF antennas, and do not work properly on or near conductive surfaces (both for the RFID tag and the UHF RFID reader). LF/HF RFID technology requires additional magnetic spacer or coating (such as ferrite) to canalize or channelize the magnetic field, which implies a complex and expensive implementation. Additionally, the LF/HF alternative magnetic field induces eddy currents in the walls of the tool cabinet, generating energy losses and heat in the toolbox, resulting in additional cost for the system to evacuate this energy.

A standard UHF RFID system comprises a reader connected to at least one antenna, and detects RFID transponders or tags within the volume covered by the radiative electromagnetic field generated by the system antennas. Typically, the external walls and doors of tool cabinets are made of metal. The radiofrequency signals, which must be exchanged between the UHF RFID system and a RFID tag, cannot effectively penetrate the external conductive walls and doors of such tool cabinets. The RFID tags which mark the tools stored in the tool cabinet cannot be detected in a metal cabinet if the RFID system is placed outside such closed tool cabinets.

SUMMARY

To effectively monitor an interior of a tool cabinet, the antennas of the UHF RFID system must be placed within the tool cabinet. However, for typical dimensions of tool cabinets, the external metallic walls and doors of the cabinet constitute a conductive closed cavity and the UHF RFID antennas positioned within the tool cabinet generate stationary waves within the cabinet volume. The establishment of stationary waves results in an electromagnetic (EM) field profile including peaks and valleys (i.e., nodes). Such an EM field profile is not appropriate for communicating with RFID tags as RFID tags positioned near a node would be unlikely to be detected in general. UHF RFID wavelength bands are limited in Europe to a narrow band 866-869 MHz and in USA to a narrow band 902-928 MHz. As a result, it is not possible to vary the UHF frequency so as to displace significantly the nodes spatial positions, and the cost associated to frequency shifting would anyway be significant. Therefore, the establishment of stationary waves within metallic cabinets is a recurring concern for detecting RFID tags within cabinets equipped with UHF RFID systems.

Described herein is a UHF radiofrequency identification (RFID) system for communicating with RFID transponders or tags within a conductive tool cabinet, and overcomes the above described drawbacks.

To this end, a UHF radiofrequency identification (RFID) system may be summarized as including a UHF RFID reader and at least one UHF RFID antenna to enable communication of said UHF RFID reader with UHF RFID transponders or tags affixed on articles within a cabinet having electrically conductive walls and at least one door, wherein said at least one UHF RFID antenna is positioned within said cabinet and in that said UHF RFID system further comprises at least one conductive surface (e.g., brewer, brasseur or cross-connector) positioned within said cabinet and set in movement by a motor.

According to a feature, the conductive surface has minimal dimensions of 20 cm in a first direction and of 10 cm in a second direction perpendicular to said first direction.

In a preferred embodiment, the conductive surface has a planar rectangular shape. In a particular embodiment, the conductive surface comprises an axis of symmetry, which is aligned with a direction of a longest dimension of said conductive surface and which forms a rotation axis for said at least one conductive surface.

According to another feature, the conductive surface is made of aluminium or of a non-electrically conductive material covered or coated with an electrically conductive material.

A system can also be summarized as including an electrically conductive closed cavity equipped with a UHF radiofrequency identification (RFID) system comprising a UHF RFID reader and at least one UHF RFID antenna for enabling communication of said UHF RFID reader with UHF RFID transponders or tags affixed on articles within said electrically conductive closed cavity, wherein said at least one UHF RFID antenna is positioned within said electrically conductive closed cavity and in that said UHF RFID system further comprises at least one conductive surface (e.g., brewer, brasseur or cross-connector) positioned within said electrically conductive closed cavity and set in movement by a motor.

According to a feature, all dimensions of said electrically conductive closed cavity, height or width or depth, is equal or superior to 50 cm, and with at least one of these dimensions exceeding 100 cm in length. In a preferred embodiment, the electrically conductive closed cavity comprises shelves and said shelves are electrically non-conductive.

According to another feature, the at least one conductive surface is enclosed within a non-conductive compartment.

In a particular embodiment, the at least said UHF RFID reader is enclosed in a compartment at the bottom of said electrically conductive closed cavity wherein a top wall of said compartment corresponds to a bottom shelf of said electrically conductive closed cavity and wherein said bottom shelf in made of or is covered or coated with an electrically conductive material.

In another embodiment, the electrically conductive closed cavity comprises electrically conductive walls and at least one door to form a tool metallic cabinet, wherein said articles are tools.

A method for enabling communication of an UHF RFID reader with UHF RFID tags affixed on articles within a cabinet having electrically conductive walls and at least one door, may be summarized as comprising: positioning at least one UHF RFID antenna within said cabinet, positioning at least one conductive surface within said cabinet, wherein said at least one conductive surface is set in movement by a motor, and establishing communication of said UHF RFID reader with said UHF RFID tags via an electrical connection between said UHF RFID and said at least one UHF RFID antenna.

In a preferred embodiment, the method further comprises controlling said motor for continuously rotating said conductive surface, and establishing communication of said UHF RFID reader with said UHF RFID tags during ten seconds while said conductive surface is set in rotation at 0.4 turn per second by said motor.

In a particular embodiment, the method further comprises establishing communication of said UHF RFID reader with said UHF RFID tags during one second while said conductive surface is not set in movement.

BRIEF DESCRIPTION OF THE DRAWINGS

Other aspects, features and advantages of the teachings of the invention will become clearer to those ordinary skilled in the art upon review of the following description in conjunction with the accompanying drawings where.

DETAILED DESCRIPTION

The UHF RFID system of the various embodiments of the invention comprises a reader and at least one antenna, to detect tools within a tool metallic cabinet or more generally articles within an electrically conductive closed cavity. The antennas are positioned within the tool cabinet and communicate with RFID transponders or tags affixed to the tools stored in the cabinet. The UHF RFID system generates RFID signals via the antennas and receives via the same antennas responses from the RFID transponders or tags attached to a tool, which need to be detected. The terms RFID transponders and RFID tags are used interchangeably herein and in the claims, and refer to transponders that reply to an interrogation signal with a response that encodes a unique identifier.

Tool metallic cabinets typically have the following dimensions: 1.8 meter high, 1.3 meter wide and 0.5 meter deep. The UHF RFID system applies to tool metallic cabinets of such dimensions and best applies for any tool metallic cabinet, whose height and width and depth dimensions are all equal or superior to 0.5 meter, and with at least one of these dimensions exceeding 100 cm in length. The minimal dimension for a metallic cabinet is three times longer than half the wavelength of the EM field generated by the UHF RFID system (i.e., about 33 cm wavelength), with at least one of these dimensions exceeding six times half the wavelength of the EM field generated by the UHF RFID system. As explained previously, UHF RFID antennas positioned within a closed metallic cabinet or a closed conductive cavity generate EM stationary waves with nodes within cabinets or cavities with such dimensions. In order to avoid the existence of static nodes and associated static "black" zones where RFID tags would be unlikely to be detected, a conductive surface (e.g., brewer, brasseur or cross-connector) 10 is part of the UHF RFID system and is positioned within the tool cabinet.

Figure 1:
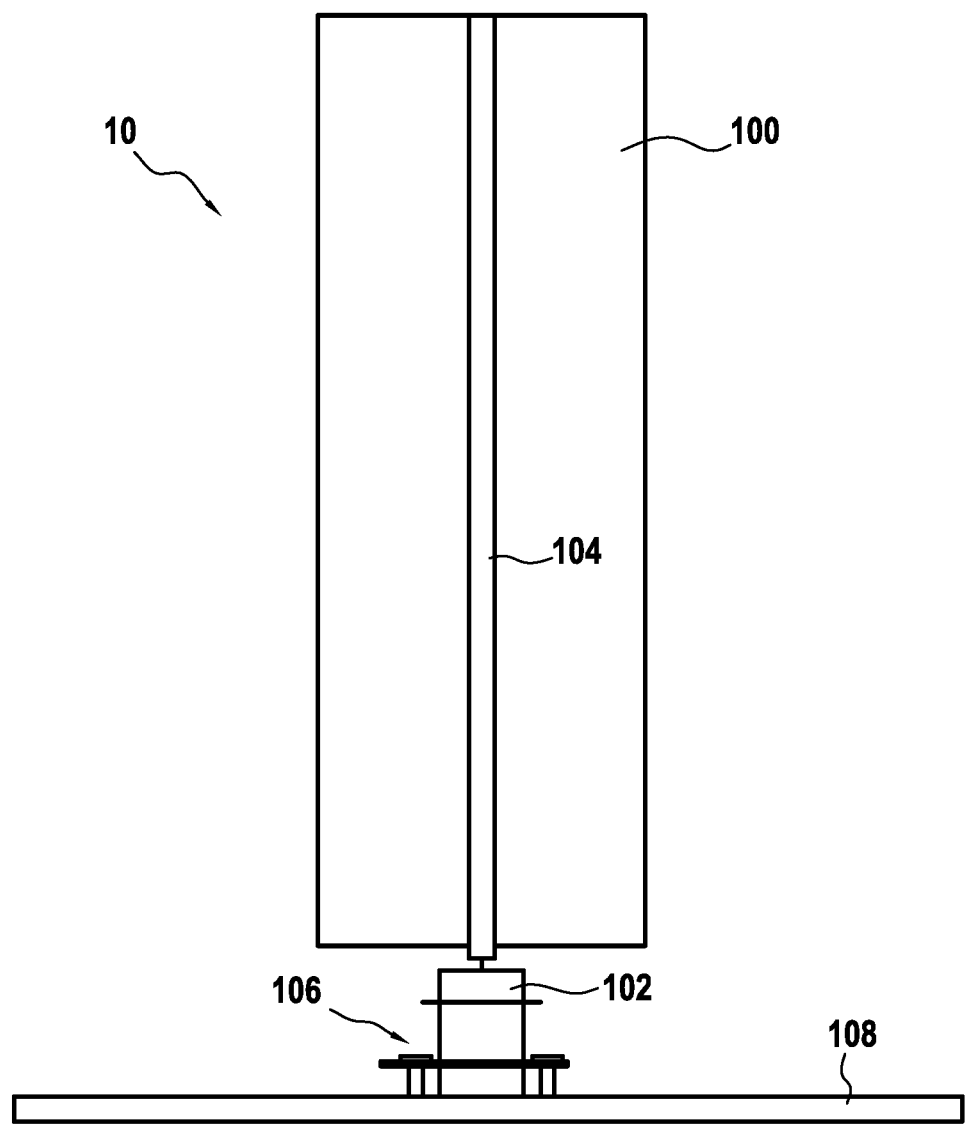
FIG. 1 represents a conductive surface (e.g., brewer, brasseur or cross-connector), the conductive surface rotated by a motor.

The conductive surface 10 is represented on FIG. 1 and comprises an electrically conductive surface 100, which is set in rotation by a motor 102. Preferably, the motor is controlled to provide a continuous rotation of the conductive surface. The rotary movement of the electrically conductive surface 100 changes the EM reflections in the cabinet resulting in a time-dependent spatial configuration of the EM stationary waves. When the electrically conductive surface 100 is static, i.e., when the motor is stopped, the spatial configuration of the EM stationary waves is static with static nodes where RFID tags would be unlikely to be detected. When the electrically conductive surface 100 is in rotary movement, i.e., when the motor is running, the spatial configuration of the EM stationary waves is dynamic with nodes, whose positions shift with time, so that RFID tags can be detected whatever their positions within the cabinet. Modelling and testing the detection of RFID tags placed in metallic cabinets with the disclosed UHD RFID system has established that an effective shift of the nodes' positions, for an RFID tags to be detected, whatever their position within the cabinet, best works for conductive cavities with at least one dimension exceeding 100 cm in length (i.e., longer than six times half the wavelength of the EM field generated by the UHF RFID system). The electrically conductive surface 100 is for example made of aluminium and is supported by an axis 104 affixed along the length of the electrically conductive surface 100. The axis 104 is fixedly connected to the rotation axis of the motor 102, which, when it runs, can rotate the assembled axis 104 and conductive surface 100. The conductive surface can be made of any electrically conductive material or of any material (e.g., non-electrically conductive) covered or coated with an electrically conductive material. The dimensions of the electrically conductive surface 100 are at least 10 cm in width and 140 cm in length. A width of 10 cm is the minimum required width for operating effectively with UHF, and more important widths can be used. Typically, a minimum 20 cm length for the conductive surface 100 is preferable, and any longer conductive surface can be used depending on the height of the cabinet. The axis 104 and the axis of the motor 102 are positioned vertically, and the motor 102 is affixed with some affixing features 106 commonly known by those ordinary skilled in the art onto a support 108, which is fixedly attached to the tool cabinet. Any kind of motor can be used, but a stepper motor or a DC motor is preferred so as to ensure the control of the rotation speed of the conductive surface 10.

Figure 2:
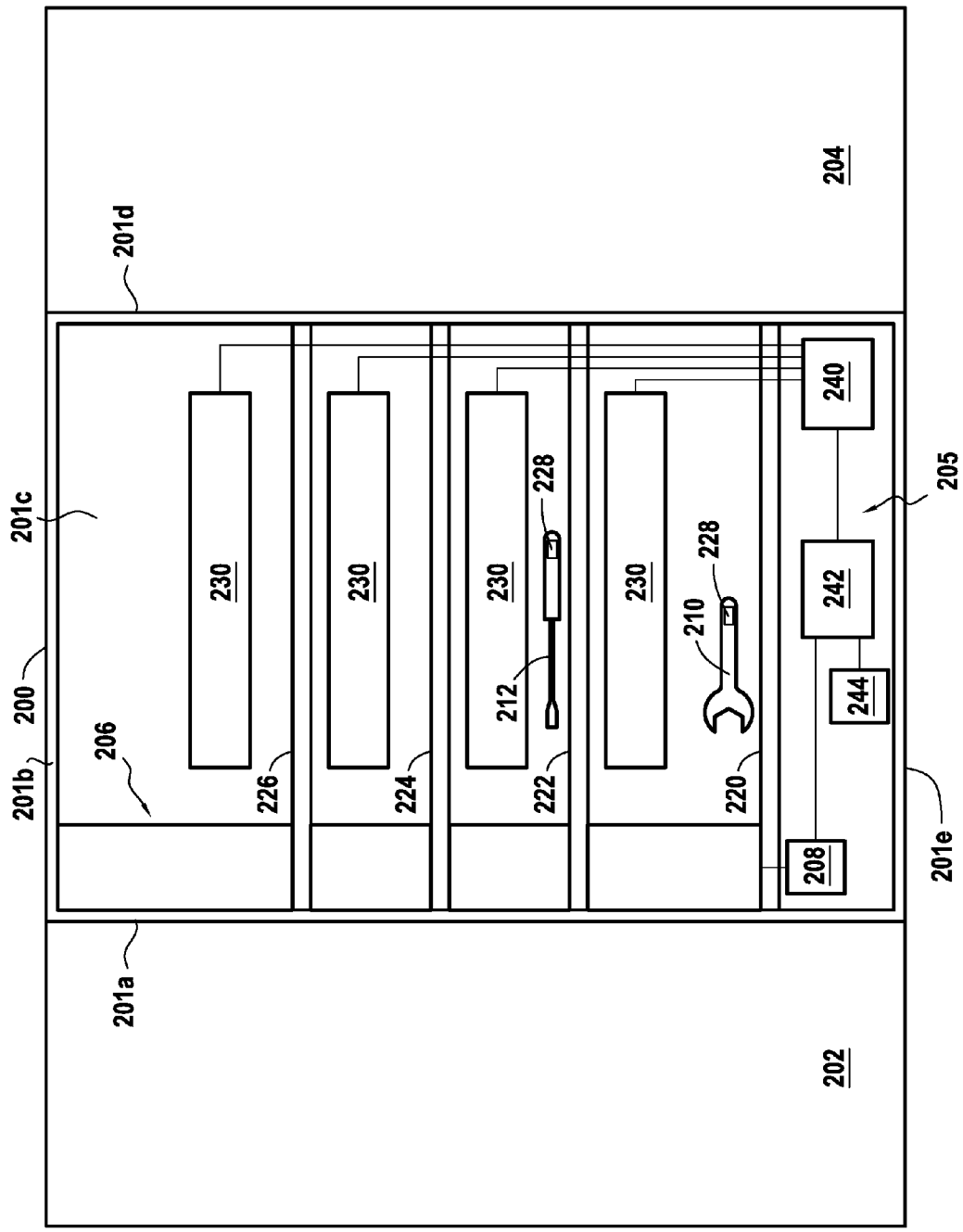
FIG. 2 represents a tool cabinet and the organization of the main components of a UHF RFID system within the cabinet.

The main components of UHF RFID system are organized within the tool cabinet 200 as represented in the FIG. 2. The tool cabinet 200 is constituted, for example, of five external metallic walls 201a, 201b, 201c, 201d and 201e and of one or two metallic doors 202 and 204, which are represented opened on FIG. 2, and comprises a compartment 205 at the bottom of the cabinet enclosing electrical components of the UHF RFID system. The conductive surface is positioned in a back corner of the cabinet and extends along the height of the cabinet. The conductive surface is enclosed within a non-conductive compartment 206 so as to prevent any mechanical interference with the rotating conductive surface. The motor of the conductive surface is powered by a motor power supply 208. Preferably, the motor and power supply are controlled by a controller 242 (e.g., motor controller, processor) so as to ensure a continuous movement of the conductive surface. The tools 210 or 212 are positioned on top of the shelves 220, 222, 224 or 226 of the tool cabinet. A RFID tag 228 is affixed on each tool, which has to be detected. An UHF RFID antenna 230 is affixed onto the back wall of the cabinet for each tool sub-cavity defined by the shelves of the cabinet. On FIG. 2, there are four UHF RFID antennas 230, which are positioned on the back wall of the cabinet in the centre of the sub-cavity defined by the shelves of the cabinet. In a preferred embodiment, the antenna 230 is a rectangular Ultra Slim RFID UHF Antenna with a width of 100 mm and a length of 1028 mm with a circular polarization. Numerous other antennas on the market can also be used in accordance with the sizes of the sub-cavities. Each UHF RFID antenna 230 is electrically connected to a UHF RFID reader 240. Conveniently, the UHF RFID system can integrate a reader using the EP CIG2 norm (ISO 18000-6C) with four antenna ports. Standard UHF RFID readers available on the market, such as Sirit 610 or Impinj speedway revolution, can be used. The UHF RFID reader 240 is connected to the controller 242, which controls the movement of the reflective surface of the conductive surface as well as other functions of the cabinet such as the locking and unlocking of the cabinet, and which is powered by an electronic power supply 244. The UHF RFID reader 240, controller 242 and the motor and electronic power supplies 208 and 244 are enclosed in a compartment 205 at the bottom of the cabinet. Preferably, the top wall of the enclosing compartment 205 corresponds to the bottom shelf 220 of the tool cabinet and preferably also forms the support 108. This top wall is made of or is covered or coated with an electrically conductive material so as to prevent any interference between the electronic equipment within the compartment 205 and the EM field generated by the UHF RFID system within the cabinet above the bottom shelf 220.

The number of UHF RFID antennas can be adjusted depending on the number of shelves and sub-cavities and the cabinet internal volume. When the UHF RFID system comprises several antennas, each UHF RFID antenna emits successively. Typically, each UHF RFID antenna emits and receives responses from the RFID tags during a time band of 100 milliseconds. As each UHF RFID antenna has a different position within the cabinet, the EM reflections within the cabinet are different and the spatial configuration of the EM stationary waves is different for each UHF RFID antenna. The use of several UHF RFID antennas can improve the detection rate of RFID tags within the cabinet. Preferably, the shelves, other than the bottom shelf 220, are made of plastic or of non-conductive material so that an RFID tag within a given sub-cavity may be detected by antennas positioned in other sub-cavities, therefore potentially improving the detection rate of RFID tag. The usage of non-conductive shelves also allows for diminishing the number of UHF RFID antennas within the cabinet and still detecting all the RFID tags present in the tool cabinet.

Although, the usage of electrically non-conductive shelves, other than for the bottom shelf 220, is preferred for the reasons explained above, electrically conductive shelves may also be used. In such a case, the number of UHF RFID antennas will need to be sufficient so that EM radiation can be emitted in all the tools sub-cavities defined by the electrically conductive shelves. Additionally, a minimum of 20 cm length of conductive surface must be included in each of these tools sub-cavities, and each of these sub-cavities need to have dimensions in height or width or depth, which is equal or superior to 50 cm, with at least one the dimensions exceeding 100 cm in length for the UHF RFID system of the invention to best work.

Although some preferred embodiments of the invention have been described above, it is to be understood that the invention is not limited to these embodiments. The invention also applies to multiple variations on the configurations of the tool cabinet and its shelves and internal sub-cavities, of the conductive surface and its position in the cabinet, of the number and type and position of the at least one antenna. The preferred configuration for the conductive surface is a planar rectangular conductive surface, rotating around its axis of symmetry, which is aligned with the direction of its longest dimension, as it is a simple and cost efficient design. However, the conductive surface may have any shape including three dimensional shapes, and other types of movement for the conductive surface as well as other types of mechanisms for moving continuously the conductive surface are applicable, as long as the continuous movement of the conductive surface changes sufficiently the EM stationary waves generated by the UHF RFID system, so that the nodes' shifts ensure that RFID tags can be detected whatever their positions within the cabinet. Typically, the conductive surface should have some minimal dimensions in a plane, which is perpendicular to its movement, for the UHF RFID system of the invention to best work. These dimensions must be at least 20 cm in a first direction and 10 cm in a second direction perpendicular to this first direction. The conductive surface can also be segmented into several smaller conductive surfaces and can be positioned in any location within the tool cabinet. Each UHF RFID antenna can also be positioned anywhere in the cabinet.

Figure 3:
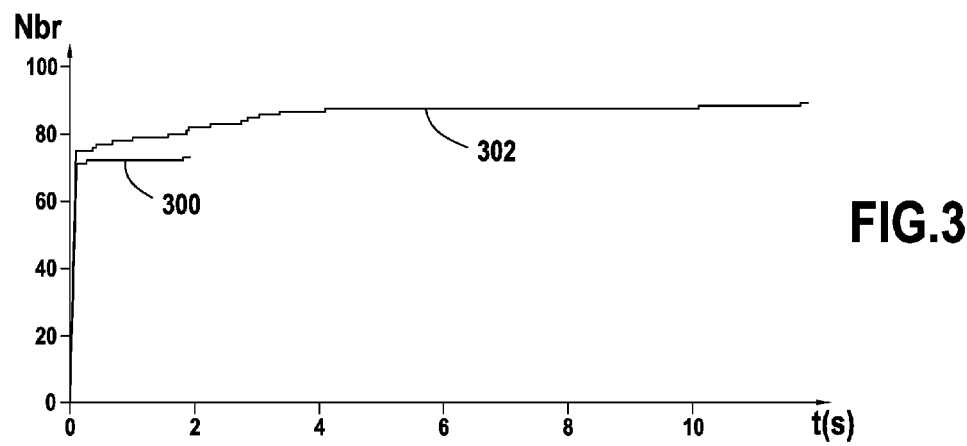
FIG. 3 shows the beneficial effect of the rotation of a conductive surface constituted of a planar rectangular conductive surface on the detection of RFID transponders or tags placed in a cabinet.

A typical test was carried out proving the necessity and benefit on the invention. Ninety RFID tags were randomly placed in a metallic cabinet with the following dimensions: 1.8 meter high, 1.3 meter wide and 0.5 meter deep. An Ultra Slim RFID UHF Antenna with a circular polarization was affixed in the cabinet on its back wall. A conductive surface constituted of a planar rectangular conductive surface in aluminium, whose dimensions are 40 cm high and 20 cm wide, was positioned along one side wall of the cabinet. An electrical DC motor could rotate at a controlled constant speed the planar rectangular conductive surface around the axis of symmetry aligned with the direction of its longest dimension. The Sirit 610 UHF RFID reader was used to generate the UHF signal and collect the responses from the RFID tags. The results showing the benefit of the rotating conductive surface are presented on FIG. 3. The displayed curves 300, 302 correspond to the cumulative number of RFID tags placed in the cabinet that are detected by the UHF RFID reader as a function of time once the UHF RFID reader starts operating. The curve 300 corresponds to the static mode when the conductive surface does not rotate. Only seventy-five RFID tags could be detected, the remaining RFID tags being positioned near nodes of the static EM stationary waves established within the cabinet. The curve 302 corresponds to a dynamic mode when the conductive surface rotates at a constant speed of 0.4 turn per second. Thanks to the rotation of the conductive surface, the ninety RFID tags could be detected after about twelve seconds.

Figure 4:
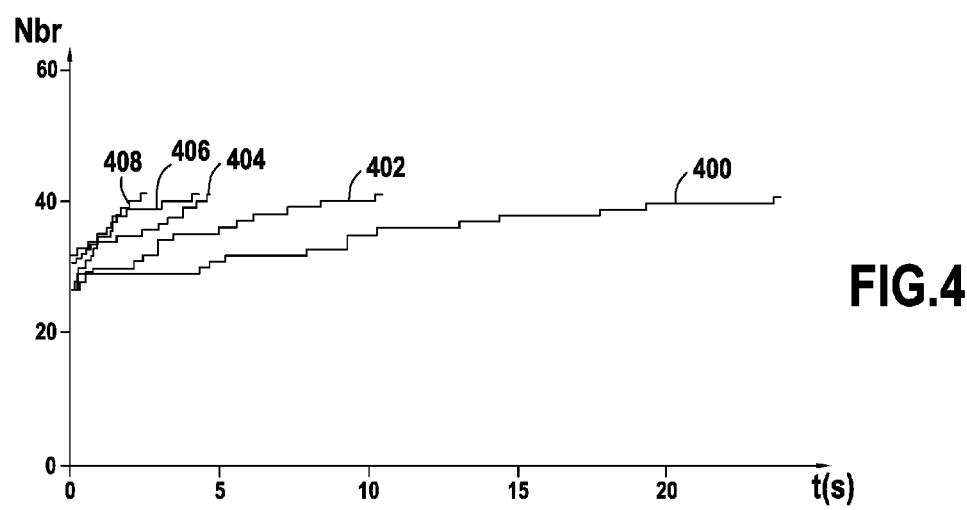
FIG. 4 displays curves, for different rotation speeds of the conductive surface, of the cumulative number of RFID transponders or tags that are detected by the UHF RFID reader as a function of time once the UHF RFID reader starts operating.

In order to decrease the time necessary for completing the detection of all the RFID tags placed in the cabinet, i.e., to decrease the time necessary for completing an inventory, it seems natural to try to increase the rotation speed of the conductive surface. The curves 400, 402, 404, 406, 408 displayed on FIG. 4 correspond to the cumulative number of RFID tags that are detected as a function of time once the UHF RFID reader starts operating for different rotation speeds of the conductive surface. Curve 400 corresponds to 0.3 turn per second, curve 402 corresponds to 0.5 turn per second, curve 404 corresponds to 0.6 turn per second, curve 406 corresponds to 0.7 turn per second and curve 408 corresponds to 0.8 turn per second. For this particular test, forty-one RFID tags were placed randomly in the cabinet. The time necessary for completing the detection of all the RFID tags placed in the cabinet decreases from about 25 seconds down to about 2 seconds when the rotation speed of the conductive surface increases from 0.3 turn per second (curve 400) up to 0.8 turn per second (curve 408).

Figure 5:
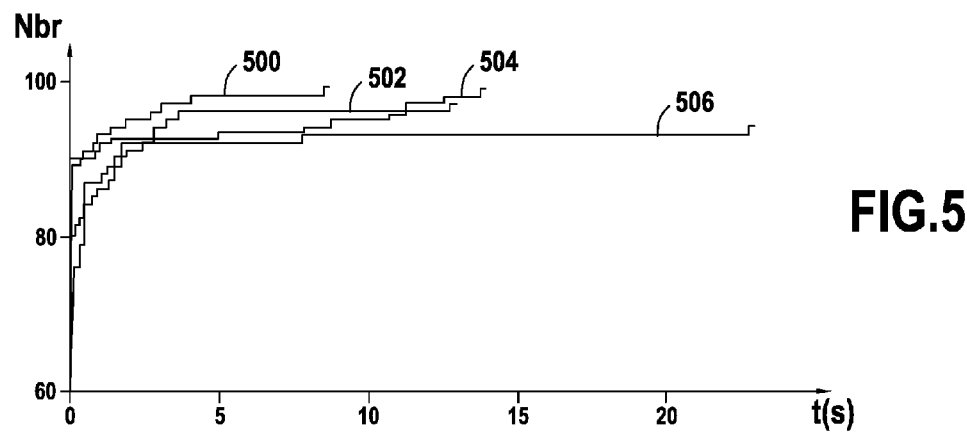
FIG. 5 displays curves, for different rotation speeds of the conductive surface, of the cumulative number of RFID transponders or tags that are detected by the UHF RFID reader as a function of time once the UHF RFID reader starts operating, in the case of a high number of RFID transponders tags placed within the cabinet.

However, such a rule of increasing the rotation speed of the conductive surface for decreasing the time necessary for completing an inventory does not apply for high numbers of RFID tags and large density of RFID tags. The same test was carried out on a hundred tags randomly placed in the cabinet and the results are presented on FIG. 5. Curve 500 corresponds to 0.5 turn per second, curve 502 corresponds to 0.6 turn per second, curve 504 corresponds to 0.7 turn per second and curve 506 corresponds to 0.8 turn per second.

These results show that, for high numbers of RFID tags and large density of RFID tags, a decrease of the rotation speed of the conductive surface is required for decreasing the time for completing an inventory.

In order to efficiently complete inventories of RFID tags within a cabinet in all different cases of small number of RFID tags, low density of RFID tags, large number of RFID tags or high density of RFID tags, the optimized rotation speed for the conductive surface has been established at 0.4 turn per second. When using the described UHF RFID system, the preferred routine for inventorying tools with RFID tags placed in a cabinet comprises the following two acts. The inventory starts with a first static act, which lasts one second, and during which the conductive surface does not rotate. The inventory continues with a dynamic act, which lasts ten seconds, and during which the conductive surface rotates at 0.4 turn per second.

The UHF RFID system of the invention is an essential component of the tool cabinet for managing the tools inventory. As the UHF RFID system detects and communicates with the RFID tags affixed on the tools, it allows for the following tool cabinet functionalities: managing the departure and the return of tools for tools maintenance, managing the departure and the return of tools for tools calibration, researching for tools within the cabinet or within the network of cabinets, managing the inventory of tools stored in the cabinet or the network of cabinets and management of tools borrowed from the cabinet or the network of cabinets. The tool cabinet is equipped with a touch screen providing access to the functionalities listed above. The touch screen (not shown) is controlled by the controller 242 (e.g., processor circuitry) and allows access to additional menus for managing the tools, for managing tool cabinet users and for maintaining the tool cabinet. Access to the tool cabinet and to the menus of the touch screen is controlled and requires an authentication of the user. The standard procedure for withdrawing a tool from the tool cabinet is as follows. The user is authenticated by the tool cabinet either by using a RFID badge containing his personal identification or by entering his personal identification via the touch screen. Then, the doors of the tool cabinet are automatically unlocked and the user can withdraw one tool or several tools from the tool cabinet. When the user closes the doors of the tool cabinet, the controller automatically locks the doors. Then, an inventory procedure is automatically launched by the controller. The UHF RFID reader feeds the UHF RFID antennas with the UHF signals for establishing a communication with the UHF RFID tags affixed on the tools stored in the tool cabinet. In a first phase (static act), the communication is established between the UHF RFID reader and the UHF RFID tags during one second while the associated conductive surfaces are not set in movement and remain immobile. In a second phase (dynamic act), the communication is established between the UHF RFID reader and the UHF RFID tags during ten seconds while the associated conductive surfaces are set in rotation at 0.4 turn per second by the motor. The combination of these two phases ensures the detection of all the UHF RFID tags present in the tool cabinet. Such inventory procedures can also be launched on a regular basis for the whole park of tool cabinets, for example at night. An inventory procedure can be launched for a particular tool cabinet only when the doors of this cabinet are closed and locked, so as to avoid any possibility of detecting a tool lying outside the tool cabinet.

Although the embodiments of the invention have been primarily described in the case of metallic or conductive cabinets, it is to be understood that the invention is not limited to the disclosed embodiments. The invention more generally applies to any electrically conductive closed cavity with a size in which stationary waves can be established for the EM frequency used by the RF system.

The invention claimed is:

1. A UHF radiofrequency identification (RFID) system comprising a UHF RFID reader and at least one UHF RFID antenna to enable communication of said UHF RFID reader with UHF RFID tags affixed on articles within a cabinet having electrically conductive walls and at least one door, wherein said at least one UHF RFID antenna is positioned within said cabinet and generates electromagnetic (EM) stationary waves with nodes and wherein said UHF RFID system further comprises at least one conductive surface positioned within said cabinet, and at least one motor the at least one conductive surface in addition to the at least one UHF RFID antenna, and the at least one motor drivingly coupled to set the at least one conductive surface in motion, so that the nodes are shifted to ensure that all said UHF RFID tags are detected in any location within said cabinet.

2. The UHF RFID system according to claim 1, wherein said movable conductive surface has minimal dimensions of 20 cm in a first direction and of 10 cm in a second direction perpendicular to said first direction.

3. The UHF RFID system according to claim 1, wherein said movable conductive surface has a planar rectangular shape.

4. The UHF RFID system according to claim 3, wherein said movable conductive surface comprises at least one brewer and has an axis of symmetry, which is aligned with a direction of a longest dimension of said movable conductive surface and which forms a rotation axis for said at least one brewer about which said brewer is rotatably moved by the at least one motor.

5. The UHF RFID system according to claim 1, wherein said movable conductive surface is made of aluminum or of a material covered or coated with an electrically conductive material.

6. An electrically conductive closed cavity equipped with a UHF radiofrequency identification (RFID) system comprising a UHF RFID reader and at least one UHF RFID antenna for enabling communication of said UHF RFID reader with UHF RFID tags affixed on articles within said electrically conductive closed cavity, wherein said at least one UHF RFID antenna is positioned within said electrically conductive closed cavity and generates electromagnetic (EM) stationary waves with nodes and wherein said UHF RFID system further comprises at least one conductive surface positioned within said electrically conductive closed cavity and a motor, the a least one conductive surface in addition to the at least one UHF RFID antenna and moveable with respect thereto, and the at least one motor drivingly coupled to move the at least one conductive surface.

7. The electrically conductive closed cavity according to claim 6, wherein all dimensions of said electrically conductive closed cavity, height or width or depth, is equal or superior to 50 cm, and with at least one of these dimensions exceeding 100 cm in length.

8. The electrically conductive closed cavity according to claim 6, wherein said electrically conductive closed cavity comprises shelves and said shelves are electrically non-conductive.

9. The electrically conductive closed cavity according to claim 6, wherein said at least one movable conductive surface is enclosed within a non-conductive compartment.

10. The electrically conductive closed cavity according to claim 6, wherein at least said UHF RFID reader is enclosed in a compartment at the bottom of said electrically conductive closed cavity wherein a top wall of said compartment corresponds to a bottom shelf of said electrically conductive closed cavity and wherein said bottom shelf in made of or is covered or coated with an electrically conductive material.

11. The electrically conductive closed cavity according to claim 6, comprising electrically conductive walls and at least one door to form a tool metallic cabinet, wherein said articles are tools.

12. A method for enabling communication of an UHF RFID reader with UHF RFID tags affixed on articles within a cabinet having electrically conductive walls and at least one door, the method comprising: positioning at least one UHF RFID antenna within said cabinet, positioning at least one conductive surface within said cabinet, the at least one conductive surface in addition to and distinct from the at least one UHF RFID antenna, operating at least one motor to move said at least one conductive surface for shifting nodes of electromagnetic (EM) stationary waves generated by the UHF RFID antenna and ensuring that all said UHF RFID tags are detected in any location within said cabinet, and establishing communication of said UHF RFID reader with said UHF RFID tags via an electrical connection between said UHF RFID and said at least one UHF RFID antenna.

13. The method according to claim 12, further comprising controlling said motor for continuously rotating said movable conductive surface, and establishing communication of said UHF RFID reader with said UHF RFID tags during ten seconds while said movable conductive surface is set in rotation at 0.4 turn per second by said motor.

14. The method according to claim 12, further comprising establishing communication of said UHF RFID reader with said UHF RFID tags during one period while said conductive surface is not moving.

* * * * *

UNITED STATES PATENT AND TRADEMARK OFFICE
CERTIFICATE OF CORRECTION

| | |
|---|---|
| PATENT NO. | : 10,102,406 B2 |
| APPLICATION NO. | : 15/418548 |
| DATED | : October 16, 2018 |
| INVENTOR(S) | : Guy Venture et al. |

It is certified that error appears in the above-identified patent and that said Letters Patent is hereby corrected as shown below:

In the Claims

Column 9, Line 51, Claim 6:
"a motor, the a least one conductive surface" should read --a motor, the at least one conductive surface--.

Signed and Sealed this
Eleventh Day of June, 2019

Andrei Iancu
*Director of the United States Patent and Trademark Office*